United States Patent [19]

Tanaka et al.

[11] Patent Number: 5,770,818
[45] Date of Patent: Jun. 23, 1998

[54] CONNECTOR FOR ESTABLISHING CONNECTION BETWEEN ELECTRIC WIRES AND FLAT CABLE AND MANUFACTURING METHOD THEREOF

[75] Inventors: Yoshiyuki Tanaka; Kouji Koike; Masataka Suzuki; Hiroyuki Ashiya, all of Shizuoka-ken, Japan

[73] Assignee: Yazaki Corporation, Tokyo, Japan

[21] Appl. No.: 636,557

[22] Filed: Apr. 23, 1996

[30] Foreign Application Priority Data

Apr. 25, 1995 [JP] Japan .................................... 7-100892

[51] Int. Cl.⁶ ............................... H01R 4/00; H01R 4/02
[52] U.S. Cl. ...................... 174/84 R; 174/88 R; 439/164
[58] Field of Search ................................ 174/72 A, 72 R, 174/84 R, 88 R, 94 R; 439/460, 15, 164

[56] References Cited

U.S. PATENT DOCUMENTS

| | | | |
|---|---|---|---|
| 1,290,153 | 1/1919 | Fitzpatrick . | |
| 3,484,541 | 12/1969 | Campbell | 174/138 F |
| 4,117,259 | 9/1978 | Giebel et al. | 174/92 |
| 4,963,699 | 10/1990 | Urushibata et al. | 174/88 R |
| 5,045,641 | 9/1991 | Urushibata et al. | 174/74 R |
| 5,057,650 | 10/1991 | Urushibata et al. | 174/88 R |
| 5,561,266 | 10/1996 | Okamoto et al. | 174/72 R |
| 5,569,882 | 10/1996 | Yokomata et al. | 174/76 |

FOREIGN PATENT DOCUMENTS

| | | | |
|---|---|---|---|
| 4-76257 | 7/1992 | Japan . | |
| 5-62754 | 3/1993 | Japan . | |
| 7-69219 | 3/1995 | Japan | 174/72 R |

*Primary Examiner*—Kristine L. Kincaid
*Assistant Examiner*—Chau N. Nguyen
*Attorney, Agent, or Firm*—Finnegan, Henderson, Farabow, Garrett & Dunner, L.L.P.

[57] ABSTRACT

A cover plate for covering exposed conductive wires of a flat cable is attached to a surface of an attaching plate for holding the flat cable, and insert molding is performed in such a manner that the cover plate is included. Therefore, direct contact of a portion of flows of synthetic resin for use in performing insert molding that flows along a surface of the attaching plate for holding the flat cable with conductive wires of the flat cable can be prevented. Moreover, if the synthetic resin introduced into another surface of the attaching plate for holding the electric wires flows in joint portions between the conductive wires, the conduction wires of the flat cable are pushed against the cover plate due to the flow of the synthetic resin so that the conductive wires of the flat cable are supported. Thus, the conductive wires of the flat cable can be protected from excess stress when the insert molding operation is performed. Thus, breakage of the conductive wires of the flat cable can be prevented.

10 Claims, 4 Drawing Sheets

CONNECTOR FOR ESTABLISHING CONNECTION BETWEEN ELECTRIC WIRES AND FLAT CABLE AND MANUFACTURING METHOD THEREOF

BACKGROUND OF THE INVENTION

The present invention relates to a connector for establishing the connections between, for example, electric wires and a flat cable for transmitting and receiving electric signals between a rotor connected to a steering wheel and a fixed member connected to a steering column of a steering mechanism of a vehicle, the connector being used in an apparatus for establishing the electrical connection between the rotor and the fixed member.

An apparatus for establishing the electrical connections, to which a connector of the foregoing type is applied, has been disclosed in Japanese Patent Laid-Open No. 7-69219.

The foregoing apparatus for establishing the electrical connections comprises a cylindrical rotor, into which the shaft of a steering wheel is inserted, an upper cover and an under cover for forming a housing which rotatively supports the rotor and which is secured to the steering column portion. An annular space formed between the rotor and the housing accommodates a flexible flat cable, which has two ends fixed to the rotor and the housing and which is bent in the annular space, and a guide roller.

In the portion of the inversion serving as the boundary, the inner part of the flat cable is wound around the external surface of the rotor, while the outer part of the same is wound around the internal surface of the under cover in a direction opposite to the direction in which the inner part is wound as described above. Moreover, connectors disposed at the two ends of the flat cable are secured to the rotor and the housing.

The two ends of the flat cable respectively are connected to electric wires in the connector so that the inner end of the flat cable is, through the electric wires, connected to, for example, various switches disposed in the steering wheel portion. On the other hand, the outer end of the flat cable is, through the electric wires, connected to a control circuit in the steering column portion.

The connector for establishing the connections between the electric wires and the flat cable is arranged in such a manner that the electric wires are press-fit and temporarily secured into grooves formed in either surface of an attaching plate; the flat cable is allowed to pass under bridges formed on another surface of the attaching plate so that the flat cable is temporarily secured; exposed conductive wires of the electric wires and the flat cable projecting over the attaching plate in the same directions are ultrasonic-welded; and then insert molding is performed in such a manner that the attaching plate including the joint portions of the conductive wires is covered with a synthetic resin member.

In the connector having the foregoing structure, the joint portions between the conductive wires are protected by the covering synthetic resin member formed by insert molding. Moreover, the tensile strengths of the electric wires and the flat cable can be maintained.

Arts concerning the foregoing connector have been disclosed in Japanese Utility-Model Laid-Open No. 4-76257 and Japanese Patent Laid-Open No. 5-62754.

However, the foregoing conventional connector for establishing the connection between electric wires and a flat cable involves the synthetic resin being brought into direct contact with the exposed conductive wires of the flat cable when insert molding is performed, thus causing excess stress to sometimes act on the conductive wires depending upon the injection pressure of the insert molding machine and the direction in which the synthetic resin is introduced. In the foregoing case, there arises a risk that the thin and breakable conductive wires are broken, thus resulting in the reliability being caused to deteriorate.

That is, the conventional connector can be obtained by setting a portion including the attaching plate and the joint portions of the conductive wires in a cavity and by performing insert molding. The synthetic resin, introduced into the cavity through the gate when insert molding is performed, is substantially sectioned into a flow along the surface of the attaching plate for holding the flat cable and a flow along the surface of the attaching plate for holding the electric wires, followed by being enclosed into the cavity. The flow of the two directional flows of the synthetic resin that flows along the surface of the attaching plate for holding the flat cable directly comes in contact with the exposed conductive wires of the flat cable. Thus, excess stress acts on the root portions of the conductive wires that are not supported, thus resulting in a risk to arise in that the conductive wires being broken at the root portions.

SUMMARY OF THE INVENTION

To solve the foregoing problems, an object of the present invention is to provide a connector for establishing the connection between electric wires and a flat cable and a manufacturing method thereof capable of stably obtaining reliable products.

To achieve the foregoing object, according to one aspect of the present invention, there is provided a connector for establishing the connection between electric wires and a flat cable in such a manner that the electric wires and the flat cable having exposed conductive wires at the leading ends thereof are held on two surfaces of an attaching plate, the conductive wires projecting over the attaching plate in the same directions are joined to each other, and the attaching plate is insert-molded in such a manner that the attaching plate is, including the joint portions of the conductive wires, covered with a synthetic resin member, the connector for establishing the connection between electric wires and a flat cable comprising: a cover plate for covering the exposed conductive wires of the flat cable, wherein the cover plate is attached to a surface of the attaching plate for holding the flat cable, and insert molding is performed in such a manner that the cover plate is included.

Since the cover plate for covering the exposed conductive wires of the flat cable is attached to the surface of the attaching plate for holding the flat cable and then insert molding is performed, direct contact of a portion of the synthetic resin for performing insert molding that flows along the surface of the attaching plate for holding the flat cable with the exposed conductive wires of the flat cable can be prevented. Moreover, when the synthetic resin that flows along another surface of the attaching plate for holding the electric wires has been introduced into the joint portions between the conductive wires of the electric wires and the flat cable, the exposed conductive wires of the flat cable are pushed against the cover plate due to the flow of the synthetic resin and thus supported. Thus, the exposed conductive wires of the flat cable can be protected from excess stress when insert molding is performed. As a result, breakage of the conductive wires during insert molding can be prevented.

Moreover, since the cover plate exists in the synthetic resin member in such a manner that it covers the exposed conductive wires of the flat cable, thermal conductive from outside can be interrupted by the cover plate. As a result, the conductive wires can be protected from thermal stress when the connector is used.

The cover plate may be formed to cover at least root portions of the exposed conductive wires of the flat cable.

As a result, the root portions of the conductive wires, which are not supported and the strengths of which are unsatisfactory, can be covered by, at least, the cover plate. As a result, the root portions of the conductive wires can be protected from excess stress when insert molding is performed. Thus, breakage of the root portions of the conductive wires during insert molding can be prevented.

A surface of the cover plate with which the cover plate is attached to the attaching plate may have projections which are in contact with the exposed conductive wires of the flat cable.

As a result, the conductive wires are covered with the cover plate in a state where the conductive wires are in contact with the projections. Therefore, the degree of deformation of the conductive wires, which are pushed against the cover plate by the synthetic resin introduced from a position adjacent to the surface of the attaching plate for holding the electric wires, can be minimized. Therefore, stress acting on the conductive wires during insert molding can be minimized.

The cover plate may have securing claws which are elastically deformed by and secured to projections formed on two side edges of the attaching plate.

Thus, by pushing the cover plate to be brought into contact with the attaching plate, the securing claws abut against the projections and elastically deform so as to be secured to the projections. As a result, the cover plate can easily be attached to the attaching plate A method may be employed which comprises the steps of: holding electric wires and a flat cable having exposed conductive wires at the leading ends thereof on two surfaces of an attaching plate in such a manner that the conductive wires are allowed to project over the attaching plate in the same directions; joining the conductive wires of the electric wires and the flat cable to each other; attaching a cover plate for covering the exposed conductive wires of the flat cable to a surface of the attaching plate which holds the flat cable; and performing insert molding in such a manner that a portion including the attaching plate, joint portions of the conductive wires and the cover plate is covered with synthetic resin.

Since insert molding is performed in a state where the exposed conductive wires of the flat cable are covered with the cover plate from a position adjacent to the surface for holding the flat cable, excess stress acting on the conductive wires during insert molding can be prevented regardless of the injection pressure and the direction in which the synthetic resin is introduced into the cavity during insert molding. Thus, breakage of the conductive wires can be prevented.

DESCRIPTION OF THE PREFERRED EMBODIMENT

A preferred embodiment of the present invention will now be described with reference to the drawings.

Figure 1:
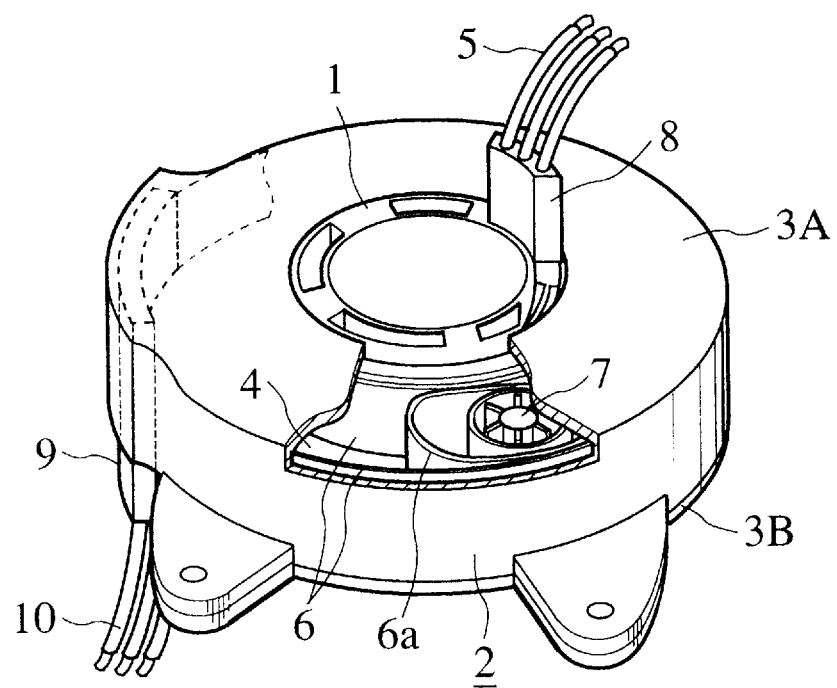
FIG. 1 is a partially-broken perspective view showing an electrical connection apparatus to which connector for establishing the connection between electric wires and a flat cable according to an embodiment of the present invention is adapted.
Figure 2:
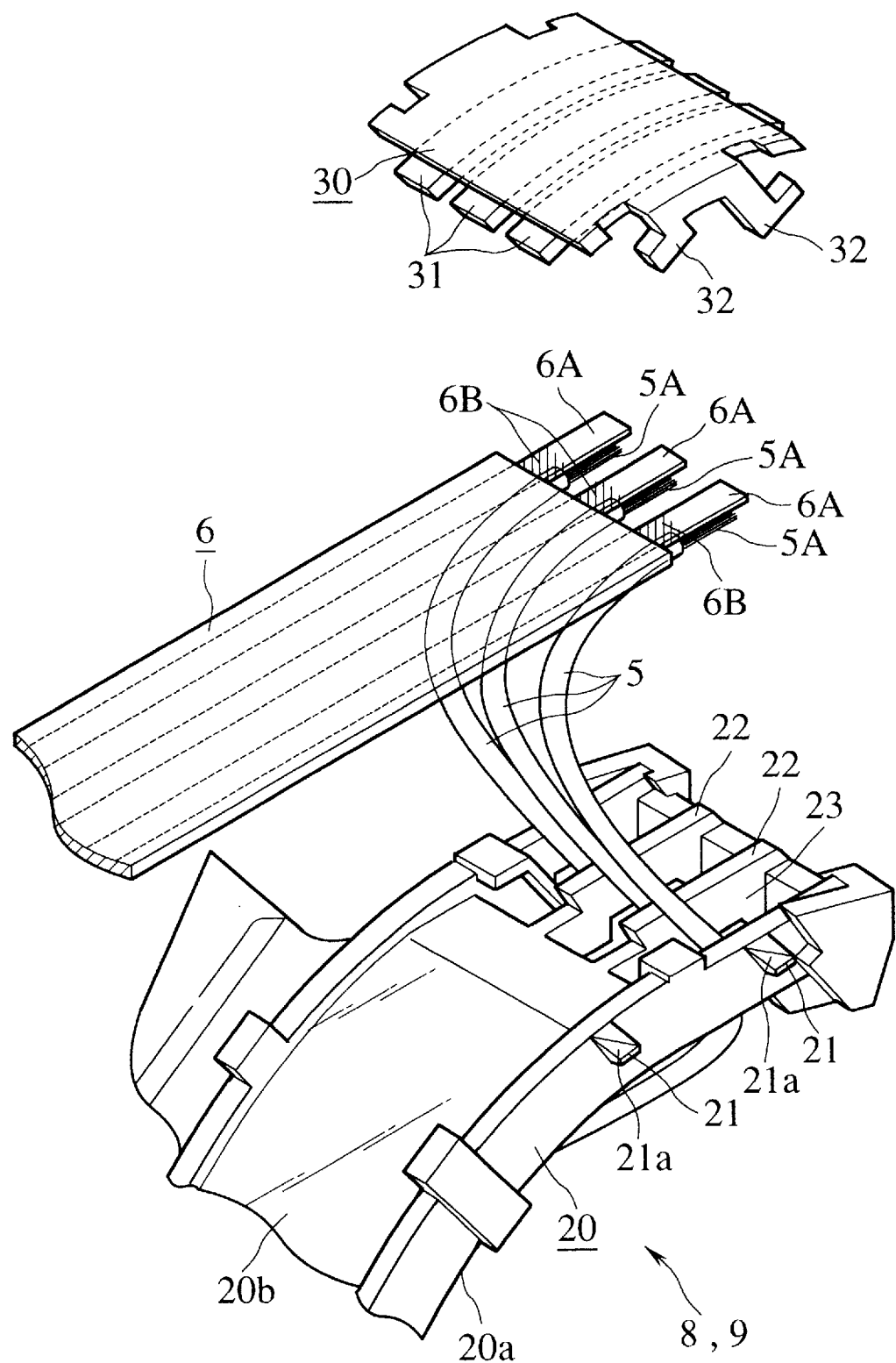
FIG. 2 is an exploded perspective view showing an essential portion of the connector shown in FIG. 1.
Figure 3:
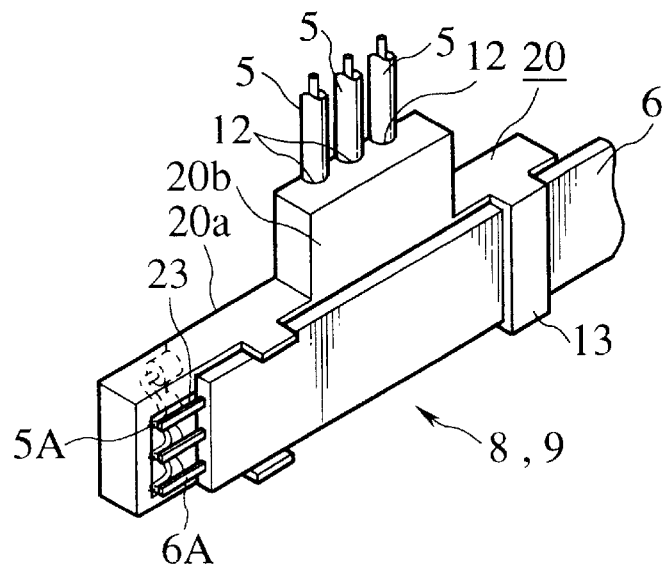
FIG. 3 is a perspective view showing the assembled essential portion of the connector in a state where the cover plate and partition plates are omitted from illustration shown in Fig.2.
Figure 4:
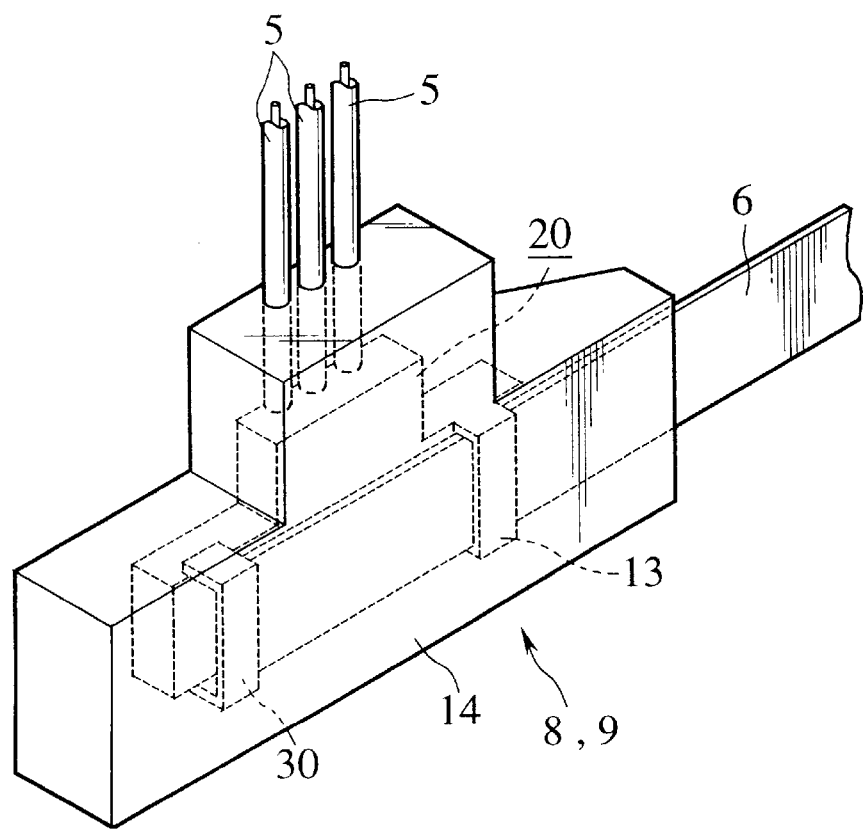
FIG. 4 is a perspective view showing the connector to which the essential portion shown in FIG. 2 has been assembled.
Figure 5:
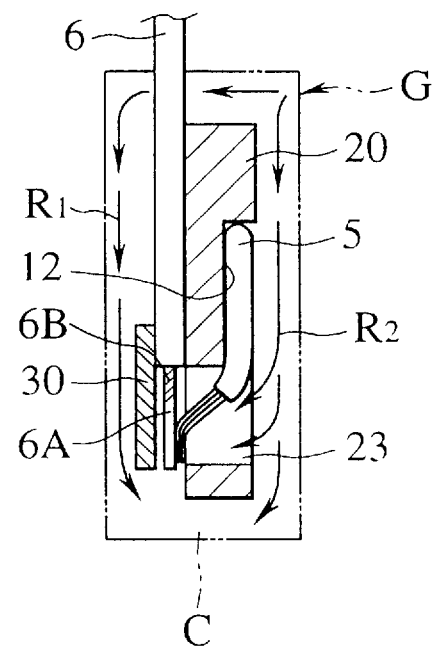
FIG. 5 is a schematic view showing a state of flows of synthetic resin when the connector shown in FIG. 4 is insert-molded in a case where a cover plate having no projection is used.

FIG. 1 is a perspective view showing an apparatus for establishing the electrical connections to which connectors 8 and 9 according to this embodiment are adapted. FIGS. 2 to 4 are enlarged perspective views showing the connectors 8 and 9 shown in FIG. 1.

The foregoing apparatus for establishing the electrical connections comprises a cylindrical rotor 1, into which the shaft (not shown) of a steering wheel is inserted, an upper cover 3A and an under cover 3B for forming a housing 2 which rotatively supports the rotor 1 and which is secured to the steering column portion (not shown). An annular space 4 formed between the rotor 1 and the housing 2 accommodates a flexible flat cable 6, which has two ends fixed to the rotor 1 and the housing 2 and which is bent in the annular space 4, and a guide roller 7.

In an inversion portion 6a serving as the boundary, the inner part of the flat cable 6 is wound around the external surface of the rotor 1, while the outer part of the same is wound around the internal surface of the under cover 3B in a direction opposite to the direction in which the inner part is wound as described above. Moreover, the connectors 8 and 9 disposed at the two ends of the flat cable are secured to the rotor 1 and the housing 2.

The two ends of the flat cable 6 respectively are connected to electric wires 5 and 10 in the connectors 8 and 9 so that the inner end of the flat cable 6 is, through the electric wire 5, connected to, for example, various switches (not shown) disposed in the steering wheel portion. On the other hand, the outer end of the flat cable 6 is, through the electric wire 10, connected to a control circuit (not shown) in the steering column portion.

As shown in FIGS. 2 and 4, each of the connectors 8 and 9 is manufactured by insert molding the joined portions of conductive wires 5A and 6A of the electric wires 5 and the flat cable 6 in such a manner that the joined portions are covered with a cover plate 30. The connectors 8 and 9 are insert-molded in such a manner that the electric wires 5 and the flat cable 6 having corresponding conductive wires 5A and 6A which are exposed to outside are held on the two surfaces of an attaching plate 20, the conductive wires 5A and 6A projecting over the attaching plate 20 in the same directions are joined to each other, and the attaching plate 20 is covered with a synthetic resin member 14 while the joined portions of the conductive wires 5A and 6A being included. As a result of insert molding performed as described above, the joined portions of the conductive wires 5A and 6A are covered with the cover plate 30.

The attaching plate 20 is in the form of a flat plate having a surface which is formed into a wire holding surface 20a having a plurality of parallel groove portions 12 formed therein. Another surface of the attaching plate 20 is formed into a flat-cable holding surface 20b having a flat surface. Moreover, window portions 23 sectioned by a plurality of partition plates 22 are formed at the end potion of the attaching plate 20. Thus, the attaching plate 20 has the foregoing structure (see FIGS. 2 and 3). Note that the partition plates 22 are omitted in FIG. 3.

The electric wires 5 are press-fit in the groove portions 12 in such a manner that the exposed conductive wires 5A are allowed to project into the window portions 23 so that the electric wires 5 are held on the wire holding surface 20a of the attaching plate 20. On the other hand, the flat cable 6 is held on the flat-cable holding surface 20b in such a manner that the flat cable 6 is allowed to pass under a bridge 13 formed on the flat-cable holding surface 20b and the exposed conductive wires 6A are allowed to project into the window portions 23 (see FIG. 3). As described above, the electric wires and the flat cable 6 are held on the two surfaces of the attaching plate 20. In the foregoing state, the conductive wires 5A and 6A projecting into the window portions 23 are joined to each other. At this time, the plural conductive wires 5A and 6A are separated by the partition plates 22 provided for the window portions 23 so that interference with the adjacent conductive wires 5A and 6A is prevented and, therefore, the conductive wires 5A and 6A are accurately joined. The joining operation is performed by ultrasonic welding.

The cover plate 30 covers the exposed conductive wires 6A of the flat cable 6 in such a manner that the cover plate 30 is attached to the attaching plate 20 from the position adjacent to the flat-cable holding surface 20b. The cover plate 30 is in the form of a plate shape having a covering area capable of covering at least root portions 6B (indicated by diagonal line portions shown in FIG. 2) of the exposed conductive wires 6A of the flat cable 6. In this embodiment, the cover plate 30 has a size capable of substantially covering the window portions 23. It is preferable that projections 31 are, as are employed in this embodiment, formed on the surface of the cover plate 30 which is attached to the attaching plate 20. The projections 31 support the conductive wires 6A from positions adjacent to the flat-cable holding surface 20b when the cover plate 30 is attached to the attaching plate 20 so that the root portions 6B of the conductive wires 6A are particularly reinforced.

More preferably, the cover plate 30 has, as employed in this embodiment, securing claws 32 which are elastically deformed by and secured to projecting portions 21 formed on the side edges of the attaching plate 20. The cover plate 30 having the securing claws 32 causes the securing claws 32 to be brought into contact with the projecting portions 21 by pushing the cover plate 30 to be brought into contact with the attaching plate 20 so that the securing claws 32 are elastically deformed and secured to the projecting portions 21. As a result, the cover plate 30 can easily be joined to the attaching plate 20.

Referring to FIG. 2, reference numeral 21a represents a tapered surface formed on each of the projecting portions 21, the tapered surface 21a having a function for guiding the securing claw 32 into the securing direction.

As described above, the conductive wires 6A of the flat cable 6 are covered with the cover plate 30 from a position adjacent to the flat-cable holding surface 20b, and then insert molding is performed so that the connectors 8 and 9 according to this embodiment are obtained.

The insert molding operation is performed in such a manner that the synthetic resin member 14 covers the attaching plate 20, the portions in which the conductive wires 5A and 6A are joined to each other, and the cover plate 30, as shown in FIG. 4.

That is, the connectors 8 and 9 according to this embodiment can be obtained by setting the overall body of the attaching plate 20, to which the cover plate 30 is attached, in a cavity C, followed by performing insert molding. When the insert molding operation is performed, synthetic resin introduced into the cavity C through a gate G is, substantially sectioned into flow R2 flowing along the wire holding surface 20a, which is one of the surfaces of the attaching plate 20, and flow R1 flowing along the flat-cable holding surface 20b, which is another surface of the attaching plate 20. Then, the synthetic resin is enclosed in the cavity C. The portion of the synthetic resin formed into the flow R1 cannot be introduced into the window portions 23 of the attaching plate 20 due to the cover plate 30. The foregoing portion of the synthetic resin is not brought into direct contact with the conductive wires 6A but the same is introduced along the surface of the cover plate 30 opposite to the conductive wires 6A. On the other hand, the portion of the synthetic resin formed into the flow R2 is introduced into the window portions 23 from a position adjacent to the wire holding surface 20a of the attaching plate 20.

Figure 6:
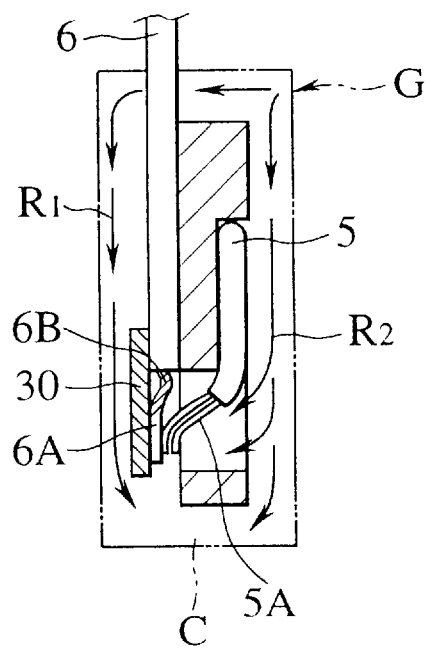
FIG. 6 is a schematic view showing a state of flows of synthetic resin when the connector shown in FIG. 4 is insert-molded in a case where a cover plate having no projection is used.

As described above, when the insert molding operation is performed, the direction of the flow of the synthetic resin into the window portions 23 of the attaching plate 20 is controlled by the cover plate 30. As a result, contact between the conductive wires 6A of the flat cable 6 and the introduced synthetic resin in the form of the flow R1 is prevented. On the other hand, when the synthetic resin in the form of the flow R2 has been introduced into the window portions 23, the conductive wires 6A are, by the flow R2, pushed against and supported by the cover plate 30 (see FIG. 6). As a result, although each of the conductive wires 6A of the flat cable 6 is formed thin and breakably, the conductive wires 6A are protected by the cover plate 30 as described above. Thus, excess stress acting on the conductive wires 6A can be prevented. In particular, breakage of the root portions 6B (indicated by the diagonal line portions) of the conductive wires 6A, which are weakest because they are not supported, can be prevented.

Figure 7:
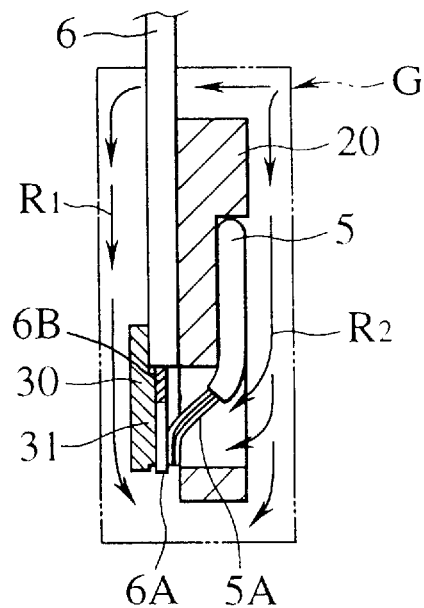
FIG. 7 is a schematic view showing a state of flows of synthetic resin when the connector shown in FIG. 4 is insert-molded in a case where a cover plate having projection is used.

Use of the cover plate 30 having the projections 31 and according to this embodiment causes the cover plate 30 to be attached in a state where the projections 31 come in contact with the conductive wires 6A of the flat cable 6 from the position adjacent to the flat-cable holding surface 20b, as shown in FIG. 7. Therefore, the degree of deformation of each conductive wire 6A which is pushed against the cover plate 30 by the introduced synthetic resin in the form of the flow R2 can be minimized. Thus, stress acting on the conductive wires 6A when the insert molding operation is performed can be minimized. As a result, breakage of the root portions 6B (indicated by diagonal line portions) of the conductive wires 6A can further reliably be prevented.

As described above, the connectors 8 and 9 according to this embodiment have improved reliability because breakage of the conductive wires 6A of the flat cable 6 when the insert molding operation is performed can be prevented.

Moreover, the connectors 8 and 9 according to this embodiment are positioned in the synthetic resin member 14 in the state where the cover plate 30 covers the exposed conductive wires 6A of the flat cable 6 (see FIG. 4). Therefore, heat conductive from outside can be interrupted by the cover plate 30 so that the conductive wires 6A are protected from thermal stress when the connectors 8 and 9 are used. As a result, the durability of the connectors 8 and 9 can be improved.

The method of manufacturing the connectors 8 and 9 for establishing the connection between the electric wires and the flat cable according to the present invention has the arrangement such that the direction of the flow of the synthetic resin, which is introduced into the joint portions between the conductive wires SA and 6A of the electric wires 5 and the flat cable 6 to perform insert molding, is controlled by the cover plate 30. Thus, excess stress acting on the conductive wires 6A of the flat cable 6 can be prevented. Therefore, products exhibiting satisfactory reliability can stably be provided regardless of the injection pressure and the direction of the flow of the synthetic resin into the cavity C when the insert molding operation is performed.

What is claimed is:

1. A connector for connecting electric wires and a flat cable comprising:
    an attaching plate including,
        a first surface for guiding the electric wires in a first direction toward exposed electric wire conductive ends, and
        a second surface for guiding the flat cable in a second direction toward exposed flat cable conductive ends, conductive the second direction being the same as the first direction; and
    a cover plate coupled to the attaching plate adjacent a joining point of the electric wire conductive ends and the flat cable conductive ends, the cover plate covering the flat cable conductive ends during an insert molding about the attaching plate.

2. A connector according to claim 1, wherein the cover plate covers root portions of the flat cable conductive ends.

3. A connector according to claim 1, wherein a surface of said cover plate includes projections contacting the flat cable conductive ends.

4. A connector according to claim 1, wherein said cover plate includes elastic securing claws for engagement with projections located on side edges of the attaching plate.

5. A connector according to claim 1, wherein the joining point of the electric wire conductive ends and the flat cable conductive ends is located adjacent an end of the attaching plate.

6. A connector for connecting electric wires and a flat cable comprising:
    an attaching plate including,
        a first surface for guiding the electric wires in a first direction toward exposed electric wire conductive ends, and
        a second surface opposite said first surface for guiding the flat cable in a second direction toward exposed flat cable conductive ends, the second direction being the same as the first direction; and
    a cover plate coupled to the attaching plate adjacent a joining point of the electric wire conductive ends and the flat cable conductive ends, the cover plate covering the flat cable conductive ends during an insert molding about the attaching plate.

7. A connector according to claim 6, wherein the cover plate covers root portions of the flat cable conductive ends.

8. A connector according to claim 6, wherein a surface of said cover plate includes projections contacting the flat cable conductive ends.

9. A connector according to claim 6, wherein said cover plate includes elastic securing claws for engagement with projections located on side edges of the attaching plate.

10. A connector according to claim 6, wherein the joining point of the electric wire conductive ends and the flat cable conductive ends is located adjacent an end of the attaching plate.

* * * * *

UNITED STATES PATENT AND TRADEMARK OFFICE
CERTIFICATE OF CORRECTION

PATENT NO. : 5,770,818
DATED : June 23, 1998
INVENTOR(S) : TANAKA et al.

It is certified that error appears in the above-indentified patent and that said Letters Patent is hereby corrected as shown below:

Title Page, Item [57], in the Abstract, line 11, "conduction" should read --conductive--.

Claim 1, column 7, line 31, before "the second", delete "conductive".

Signed and Sealed this

Twenty-second Day of June, 1999

*Attest:*

Q. TODD DICKINSON

*Attesting Officer*     *Acting Commissioner of Patents and Trademarks*